Oct. 4, 1966   R. WINKLER ETAL   3,276,306
CUTTING DEVICE FOR MAKING CUTS IN SHEET MATERIAL
Filed April 7, 1965
3 Sheets-Sheet 2
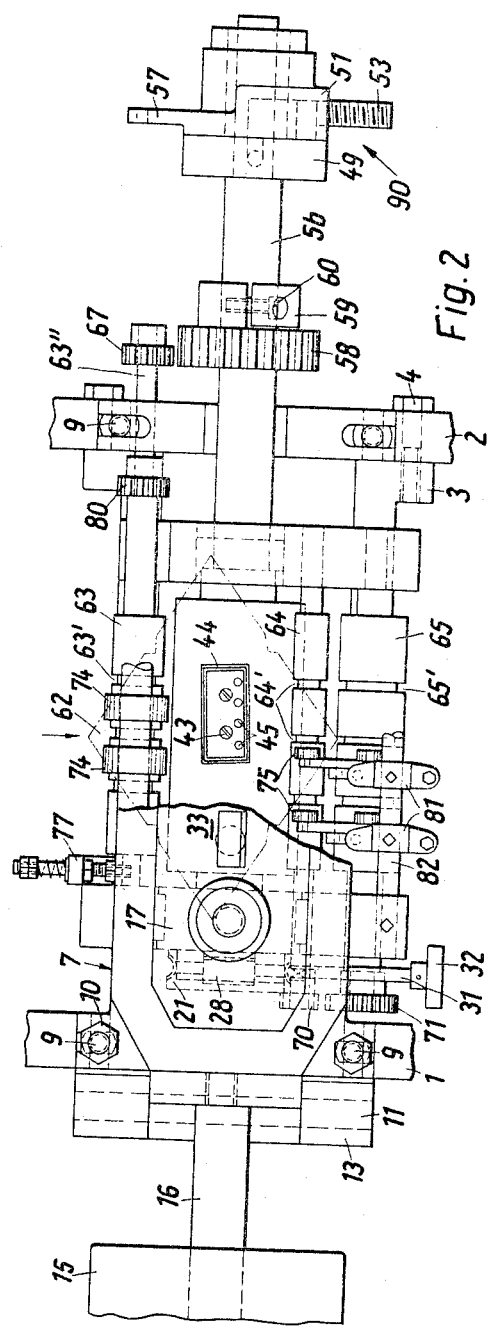
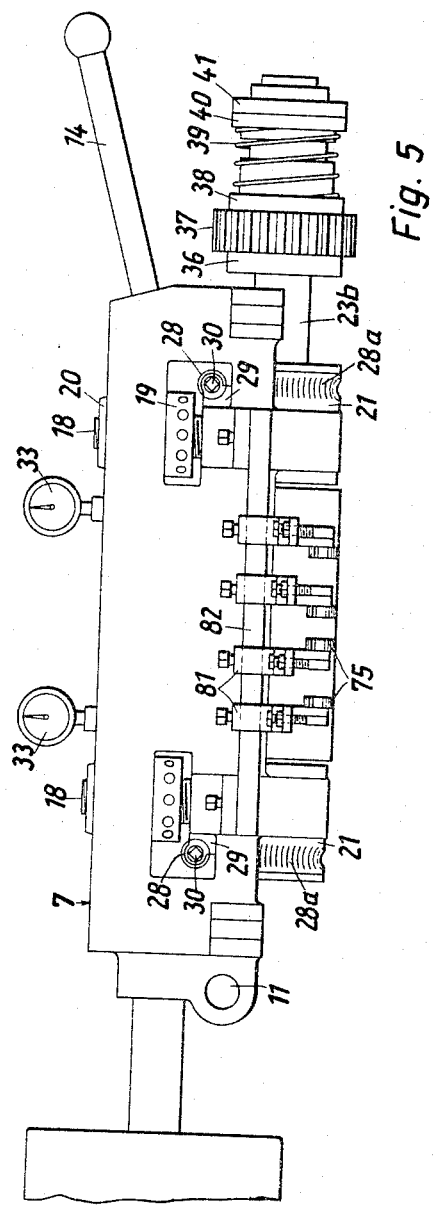
Inventors
RICHARD WINKLER
KURT DÜNNEBIER
By Hane and Baird
ATTORNEYS

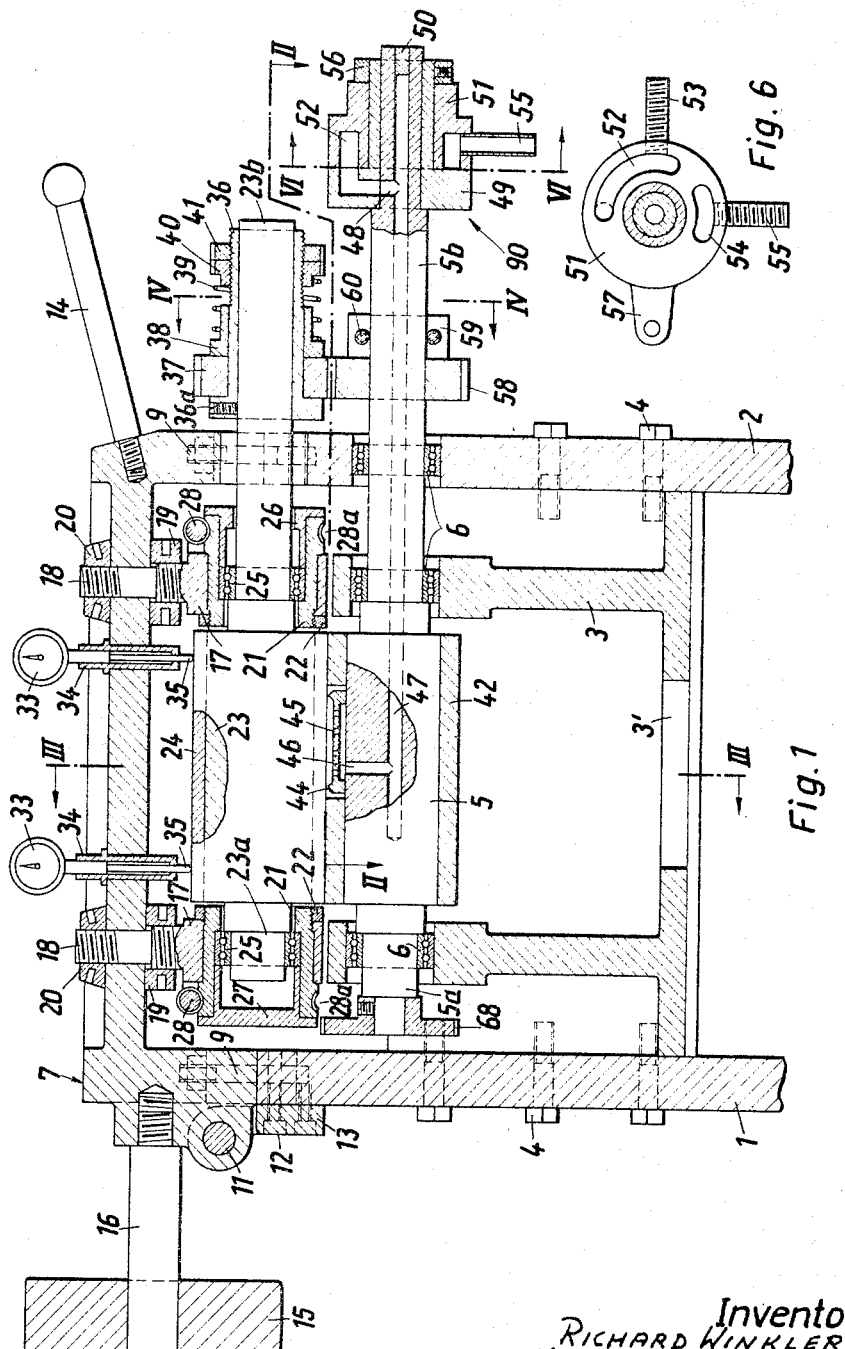

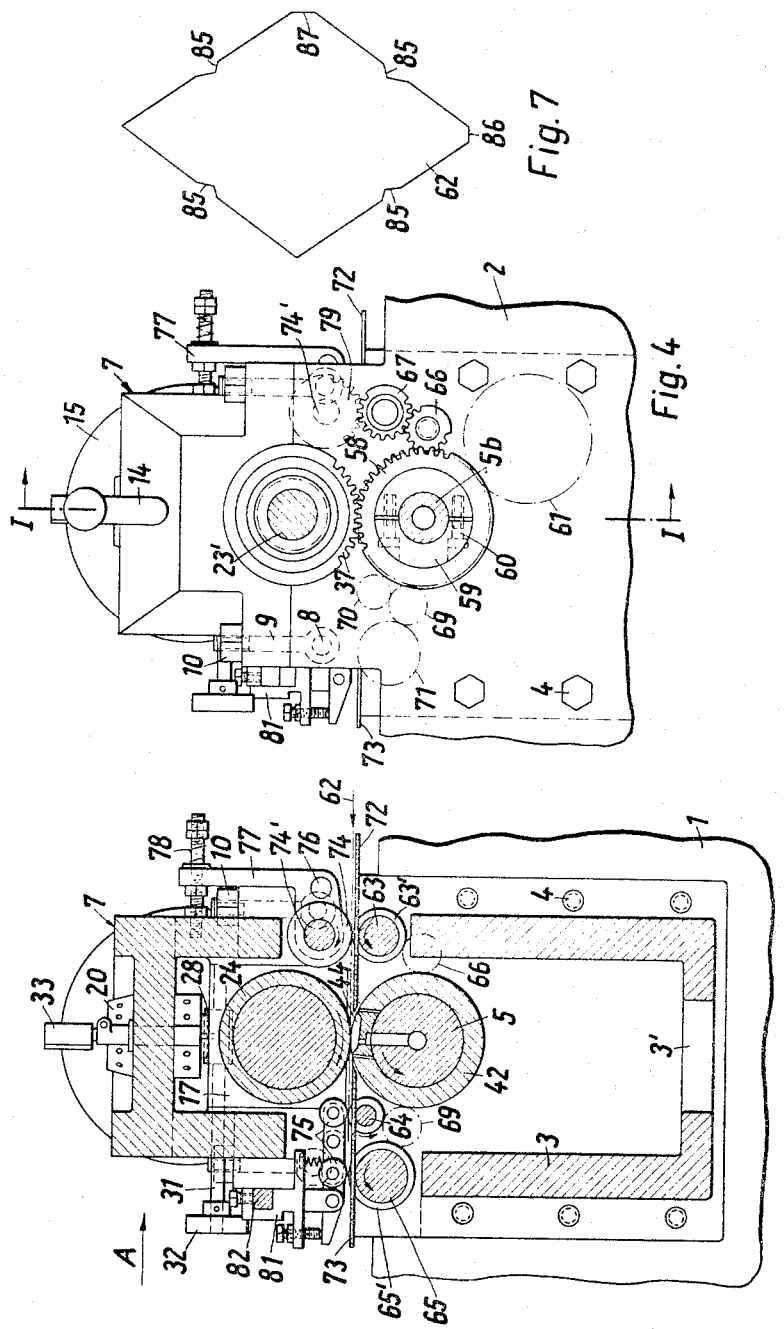

United States Patent Office 3,276,306
Patented Oct. 4, 1966

3,276,306
CUTTING DEVICE FOR MAKING CUTS IN
SHEET MATERIAL
Richard Winkler, Rengsdorf uber Neuwied, and
Kurt Dünnebier, Gladbach, Germany
Filed Apr. 7, 1965, Ser. No. 446,163
Claims priority, application Germany, Apr. 18, 1964,
W 36,601
9 Claims. (Cl. 83—311)

The present invention relates to a device for making cuts for window openings and other cuts or separation cuts in moving blanks in the form of individual blanks or webs of sheet material, such as paper. Cutting devices of this kind are used in conjunction with machines for manufacturing envelopes, flat bags, etc. More particularly, the invention relates to a cutting device in which the cutting is effected by a rotary cutting roller having mounted thereon cutting knives shaped in accordance with the curvature of the roller and the cuts to be made and coacting with a usually polished hard counter roller the peripheral surface of which is closely adjacent to the cutting edges of the knives on the cutting roller. The blank to be cut is guided between the two rollers.

Cutting devices of the general type above referred to as are now known have several disadvantages, especially when used for prolonged continuing operation. It is difficult to maintain the spacing between the cutting edges of the cutting knives and the peripheral wall of the counter roller at the required distance, usually on the order of 0.01 mm. or less, and to readjust the spacing when the knives become worn after prolonged operation. Such accurate spacing between the cutting edges and the counter roller is necessary to achieve that the paper or other sheet material is just cut through, but no appreciable frictional pressure between the cutting edges and the counter roller exists. Such pressure would cause premature and rapid blunting of the cutting edges and/or damage to the polished surface of the counter roller. Furthermore, in cutting devices as now known, mounting of the feed rollers closely before and behind the cutting roller and the counter roller required to effect intermittent transport and standstill of the blanks makes the cutting knives difficult of access. As a result, sharpening or honing of the cutting edges of the cutting knives necessary to obtain uniform cutting at all points is very difficult. It is impractical to solve the problem of making the cutting roller the upper roller instead of the lower roller, as is customary, since to effect a clean cut line, cutting must be effected on the side of the blank which constitutes the outside of the finished envelope, etc.

It is a broad object of the invention to provide a novel and improved cutting device of the general kind above referred to which eliminates the afore-pointed-out disadvantages of conventional cutting devices by making the cutting knives on the cutting roller conveniently accessible for sharpening or honing while retaining it as the lower roller.

The aforementioned object, feature and advantage of the invention, and other objects, features and advantages which will be pointed out hereinafter, are attained by mounting an assembly including the counter roller and the feed rollers disposed as conventional closely before and behind the counter roller so that the entire assembly can be separated from a support for the cutting roller so that the knives on the cutting roller are freely accessible, while maintaining said assembly and said support structurally joined. The bearings in which the counter roller is journaled are preferably so arranged that the spacing between the peripheral wall of the counter roller and the edges of the knives on the cutting roller can be finely and accurately adjusted while the envelope-making machine on which the cutting device is mounted, is operated.

For this purpose, the bearing bushings for the counter roller may have an eccentric bore and means are provided for turning the bearing bushings to effect displacement of the lengthwise center axis of the bushings and thus a change in the distance between the counter roller and the cutting edges of knives.

The invention also includes the provision of precision probe means for measuring and indicating the distance between the knives and the counter roller.

According to the invention the counter roller is preferably driven by variable speed drive means which permit convenient setting of any selected peripheral speed of the counter roller relative to the peripheral speed of the cutting edges down to a zero relative speed. To effect such adjustability within a wide range, the drive means for the counter roller may include a gear which is drivingly coupled with the drive shaft of the counter roller by means of a slip clutch.

The aforementioned means for separating the assembly including the counter roller and the feed rollers from the cutting roller to render the same accessible may comprise a hinge hinging said assembly to the support for the cutting roller.

In the accompanying drawing, a preferred embodiment of the invention is shown by way of illustration, and not by way of limitation.

In the drawing:

FIG. 1 is a longitudinal section of a cutting device according to the invention taken on line I—I of FIG. 4;

FIG. 2 is a plan view of the cutting device, part of the assembly including the counter roller and guide members for the blanks being omitted for clarity of illustration;

FIG. 3 is a section taken on line III—III of FIG. 1;

FIG. 4 is a fragmentary section taken on line IV—IV of FIG. 1;

FIG. 5 is an elevational view of the movable assembly including the counter roller and the feed rollers, the view being taken in the direction of the arrow A in FIG. 3;

FIG. 6 is a section taken on line VI—VI of FIG. 1; and

FIG. 7 is a plan view of an envelope blank in which cuts are made by a cutting device according to the invention.

Referring first to FIGS. 1 through 4, these figures show side walls 1 and 2, which should be visualized as constituting side walls of a frame structure of the cutting device and also of an envelope-making machine, which is not shown in detail, since it does not constitute part of the invention. A generally box-shaped member 3 for catching cut off pieces of paper is secured between the side walls by suitable means, such as screws 4. A cutting roller 5 is rotatably mounted in box 3 and on side wall 2. The cutting roller is rotatably supported by means of pivot pins 5a and 5b in suitable bearings 6, such as roller bearings, and is secured against axial displacement. An opening 3' in box 3 should be visualized as communicating with a suction duct through which the cut off pieces of paper or other sheet material are removed. The suction duct and the components associated therewith are not illustrated, since they do not constitute part of the invention. An upper assembly structure 7 rests upon the top faces of side walls 1 and 2. It is secured by screw bolts 9 pivotal about pivots 8 in the side walls and nuts 10. The assembly 7 is hinged to side walls 1 by means of a hinge 13 which is secured to the side wall by a pivot 11 and screws 12. After loosening nuts 10 and pivoting screw bolts 9, the entire assembly 7 can be pivoted upwardly about pivot 11 as the turning point. A grip 14 may be provided to facilitate tilting of the assembly.

The tilting of the assembly can be further facilitated by providing a balance weight in the form of a weight 15 mounted on a bolt 16 screwed into assembly 7, as shown in FIG. 1. Instead of using a balance weight, a suitably mounted loaded tension spring can also be provided.

Assembly 7 comprises two bearing shells 17 which are retained by threaded bolts 18. The lengthwise position of the bolts is adjustable by means of nuts 19 and 20, as is clearly shown in FIG. 1. Each of bearing shells 17 includes a bushing 21. These bushings are rotatable in the shells but are suitably secured against axial displacement, for instance, by a nut or setting ring 22. The bores of bushings 21 are eccentric and receive pivot shafts 5a and 5b of the counter roller 23 of the device. Roller 23 has a hard, usually polished shell 24 and its pivot shafts are journaled in the bushings 21 preferably by means of roller bearings 25. The roller bearings are secured against axial displacement by suitable means, such as end plates 26 and 27. Each of the two bushings has an outer peripheral worm gear 28a which is engaged by a worm 28. The worms are rotatable in bearings 29, which are laterally secured to both bearings 17, as can best be seen in FIG. 5. An extension 30 of square or other non-round cross section on worm 28 receives an actuating bar 31, preferably terminating in a milled or knurled knob 32. As is evident, rotation of the worms by means of knobs 32 will cause a corresponding change in the eccentric positions of bushings 21 and thus of counter roller 23 in reference to cutting roller 5.

Two probes 33 are mounted by means of holders 34 in assembly 7. The probes have probe pins 35 engageable with the peripheral shell 24 of the counter roller. The probes will indicate any lifting or lowering of the counter roller in reference to the cutting roller on a suitably calibrated scale. Means for translating the lengthwise displacements of probe pins 35 into angular positions of an instrument pointer are well known in the art. The probe pins 35 may be lifted clear of shell 24 when the cutting device is in operation.

Pivot shaft 23b of the counter roller has fixedly mounted thereon a bushing 36 which seats a drive gear 37 for roller 23. The gear is retained in its angular position on bushing 36 by a slip clutch formed by a second bushing 38, a clutch spring 39 and nuts 40 and 41 screwed upon an externally threaded portion of bushing 36, as is indicated in FIG. 1 by dotted lines. As is evident, the force with which gear 37 is retained in its angular position on bushing 36 is controlled by the loading of a clutch spring 39, which presses gear 37 against a flange 36a of bushing 36 and is controlled by the setting of nuts 40 and 41.

Cutting roller 5 is encased by a shell 42 which preferably has a hard polished outer surface. The roller mounts a window-cutting knife 44 secured to the roller by suitable means, such as screws 33. Several knives may be provided. The cutting edges of the knife protrude slightly from the outer periphery of shell 42. Obviously, the cutting edge portions extending in circumferential direction must be curved in accordance with the curvature of shell 42. The cutting knife includes several ports 45 which are connected by bores or ducts 46, 47 and 48 extending through the roller and its pivot shaft 5b with a member 49 of a control head 90. The control head is seated on the pivot shaft 5b of roller 5 and member 49 is fixedly secured on the pivot shaft for rotation in unison therewith. The control head serves to supply either suction air or pressure air to ports 45. Duct 47 is closed off by a stop 50 in the control head. In addition to member 49, the control head comprises a stationary member 51, which, as is shown in FIGS. 1 and 6, includes a circumferentially elongated channel 52 connected by a connector stud 53 and a pipe or hose (not shown) to a supply of suction air. Control head member 51 further includes a shorter circumferential channel 54 which is connected through a connector stud 55 and a pipe or hose (not shown) to a supply of pressure air. A setting ring 56 secures control head member 51 against axial displacement. Member 51 may be secured against rotation by any suitable means, such as a locking pin engaging the body of the member and stationarily mounted. The means for securing member 51 against rotation should be arranged in a conventional manner so that the angular position of the member is adjustable to permit placement of the member in its correct angular position with reference to cutting knife 44; that is, so that the ports 45 therein are supplied with suction air or pressure air in an appropriate sequence. Air control means of this kind are well known in the art and do not constitute part of the invention.

A gear 58 in engagement with the afore-described drive gear 37 for counter roller 23 is secured on pivot shaft 5b of cutting roller 5 by any suitable means, such as a clamping plate 59 and screws 60. Gear 58 is driven by a gear 61 (see FIG. 4), which should be visualized as being part of the drive means of the envelope-making machine. The rotational speed of cutting roller 5 is selected so that roller 5 makes one revolution for each blank 62 supplied to the cutting device.

Feed rollers 63, 64 and 65, as best shown in FIGS. 2 and 3, are rotatably supported in the lower part of the structure of the device; that is, the part including side walls 1 and 2 and box 3. The feed rollers are rotated at the same rotational speed as the cutting roller. Roller 63 is driven by gear 58 through an intermediate gear 66 (FIG. 4) and a pinion 67. Feed rollers 64 and 65 are driven by a gear 68 secured on pivot shaft 5a of the cutting roller through an intermediate gear 69 (see FIGS. 2, 3 and 4) and gears 70 and 71. Each of the rollers 63, 64 and 65 has in its periphery one or several annular grooves 63', 64' or 65', respectively, which are engaged by guide plates 72 and 73 for the blanks 62 as is best shown in FIG. 3. The depth of the grooves and the arrangement of the guide plates are such that the full peripheral wall portions of the rollers protrude radially above the surfaces of the guide plates.

The upper assembly 7 mounts rollers 74 disposed above roller 63, and rollers 75 disposed above rollers 64 and 65. The rollers are so mounted that they can be axially displaced; that is, crosswise of the direction in which the blanks 62 are displaced, to adjust the positions of the rollers in acordance with the configuration of the blanks. Each roller 74 is seated on a shaft 74' which is supported on a lever 77 pivotal about a pivot 76, as best shown in FIG. 3. Springs 78 urge the rollers 74 against roller 63. One end of shaft 74' has fixedly secured thereto a pinion 79 (FIG. 4) which is in engagement with a pinion 80 on a shaft 63". Rollers 75 are pivotally supported on levers (not shown) and are pressed by springs (not shown) against rollers 65 and 64 disposed below rollers 75. Each pair of rollers 75 is supported on a spring-loaded holder 81. The holders are slidably mounted on a guide rail 82 and are secured in the selected positions by suitable clamping means.

During the operation of the device each one of the individually fed blanks is first gripped between feed roller 63 and feed rollers 74 and is then lead past the cutting roller 5 and the counter roller 23 between the feed rollers 64 and 65 and feed rollers 75.

At the beginning of the cutting of a window (position of FIG. 3), the ports 45 of the cutting knife are supplied with suction air through the channel 52 of member 51 of control head 90, whereby the cut pieces of sheet material are held at the ports and carried along by the cutting roller 5. After about half a revolution of the cutting roller the ports are supplied with pressure air through the channel 54 of member 51 and the cut pieces of the sheet material are now blown downwardly into box 3.

As is apparent, the concept of the invention is not limited to the described and illustrated structure. The movement of assembly 7 into a position in which the cutting roller is readily accessible, can be effected by means other than hinge means for pivoting assembly 7 about a pivot axis, while maintaining a mechanical connection between assembly 7 and the lower part of the device. The adjustment of the distance between the cutting edges of the cutting roller and the peripheral wall of the counter roller by increments detected and indicated by probe means can be effected by displacing the cutting roller rather than the counter roller. Instead of feeding individual blanks, the blanks may be in the form of a continuous web. The cutting knives on roller 5 may have a shape such that corners and notches are cut, as is illustrated in FIG. 7, which shows a blank in which corners 85 and tips 86 and 87 are cut off.

While the invention has been described in detail with respect to a certain now preferred example and embodiment of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. A device for making cuts in blanks of sheet material, said device comprising a rotary cutting roller, a rotary counter roller, a lower first frame structure supporting said cutting roller, an upper second frame structure supporting the counter roller, mounting means supporting said second frame structure on the first frame structure movable between a first position in which said counter roller coacts with said cutting roller and a second position in which said first frame structure and said second frame structure are spaced apart to render the cutting roller freely accessible, and feed rollers for moving the material to be cut between and past said cutting roller and said counter roller in the coacting position thereof, said feed rollers being mounted on said second frame structure for movement in unison therewith.

2. A cutting device according to claim 1 and comprising first drive means for driving said cutting roller mounted on said first frame structure, and second drive means for driving the counter roller mounted on said second frame structure, said first and second drive means being in driving engagement with each other in the first position of said frame structures and disengaged in the second position of said frame structures.

3. A cutting device according to claim 1 and comprising first drive means for driving said cutting roller mounted on said first frame structure, and second drive means for driving the counter roller mounted on said second frame structure, said second drive means including speed-regulating means for varying the rotational speed of the counter roller in reference to the rotational speed of the cutting roller.

4. A cutting device according to claim 3, wherein said speed-regulating means comprises an adjustable slip clutch.

5. A cutting device according to claim 1, wherein said mounting means comprise hinge means hingedly connecting said two frame structures for tilting the second frame structure into a position uncovering the cutting roller on the first frame structure.

6. A device for making cuts in blanks of sheet material, said device comprising a rotary cutting roller having cutting edges, a rotary counter roller, a lower first frame strutcure supporting said cutting roller, an upper second frame structure supporting the counter roller, mounting means supporting said second frame structure movable between a first position in which said counter roller coacts with said cutting roller and a second position in which said first frame structure and said second frame structure are spaced apart to render the cutting roller freely accessible, adjusting means coacting with one of said rollers for varying the spacing between the cutting edges on the cutting roller and the peripheral wall of the counter roller, said adjusting means being also supported by said second frame structure for movement in unison therewith.

7. A cutting device according to claim 6 and comprising detecting means for probing and indicating said spacing.

8. A cutting device according to claim 7, wherein said detecting means comprise a probe element probing the peripheral wall of said counter roller, and holding means for moving said probe element into and out of engagement with said peripheral wall.

9. A cutting device according to claim 6, wherein said adjusting means comprise eccentric bearings in which said counter roller is journaled, and actuating means for rotating said bearings, thereby correspondingly varying the axial spatial position of the counter roller in reference to the rotational axis of the cutting roller to vary said spacing between said rollers.

References Cited by the Examiner
UNITED STATES PATENTS

| | | | |
|---|---|---|---|
| 219,205 | 9/1879 | Braley | 83—346 X |
| 1,160,833 | 11/1915 | Braddock | 83—433 |
| 2,397,603 | 4/1946 | Hackett | 83—344 X |
| 2,662,598 | 12/1953 | Burdwood | 83—482 X |
| 3,163,071 | 12/1964 | Bergstrand | 83—564 X |

WILLIAM W. DYER, JR., *Primary Examiner.*

J. M. MEISTER, *Assistant Examiner.*